United States Patent [19]

Maiocchi

[11] 4,169,495

[45] Oct. 2, 1979

[54] RADIAL TIRE FOR MOTOR VEHICLES

[75] Inventor: Luigi Maiocchi, Milan, Italy

[73] Assignee: Industrie Pirelli S.p.A., Milan, Italy

[21] Appl. No.: 943,232

[22] Filed: Sep. 18, 1978

Related U.S. Application Data

[63] Continuation of Ser. No. 753,290, Dec. 22, 1976, abandoned.

[30] Foreign Application Priority Data

Jan. 5, 1976 [IT] Italy .............................. 19019 A/76

[51] Int. Cl.² ............................................... B60C 9/20
[52] U.S. Cl. ........................... 152/361 R; 152/354 R; 152/361 DM
[58] Field of Search ..... 152/361 R, 361 DM, 361 FP, 152/354 R

[56] References Cited

U.S. PATENT DOCUMENTS

| | | | |
|---|---|---|---|
| 2,945,525 | 7/1960 | Lugli ................................ | 152/361 R |
| 3,503,432 | 3/1970 | Maiocchi ......................... | 152/361 DM |
| 3,625,272 | 12/1971 | Fletcher .......................... | 152/361 R X |
| 3,643,723 | 2/1972 | Mukai et al. ................... | 152/361 DM |
| 3,667,527 | 6/1972 | Magistrini et al. ............ | 152/361 R X |
| 3,786,851 | 1/1974 | Mirtain et al. ................. | 152/361 DM |
| 3,850,219 | 11/1974 | Snyder ............................. | 152/361 DM |
| 3,999,585 | 12/1976 | Grawey ........................... | 152/361 DM X |

Primary Examiner—Randolph A. Reese
Attorney, Agent, or Firm—Stevens, Davis, Miller & Mosher

[57] ABSTRACT

A pneumatic tire having a radial carcass is provided with a reinforcing structure between the carcass and tread having first and second layers of metallic cords having an ultimate elongation of about 3%. The cords of the first and second layers are disposed parallel to each other and at angles of about 5° to about 30° with the axis of the tire body with the cords in one layer crossing the cords of the other layer. A third layer of metallic cords having an ultimate elongation of from about 4% to about 8% is disposed radially outwardly over the first two layers. The cords in the third layer are wound about the carcass in a plane which is substantially parallel to the longitudinal direction of the tire. The resulting assembly of layers provides a reinforcing structure which is adapted to withstand the tension stresses exerted on tires used on heavy vehicles such as buses and trucks even at high speed, giving also high steering characteristics to the tire.

3 Claims, 3 Drawing Figures

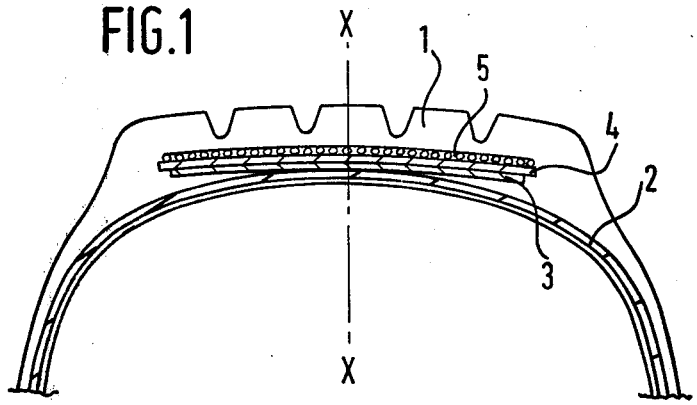
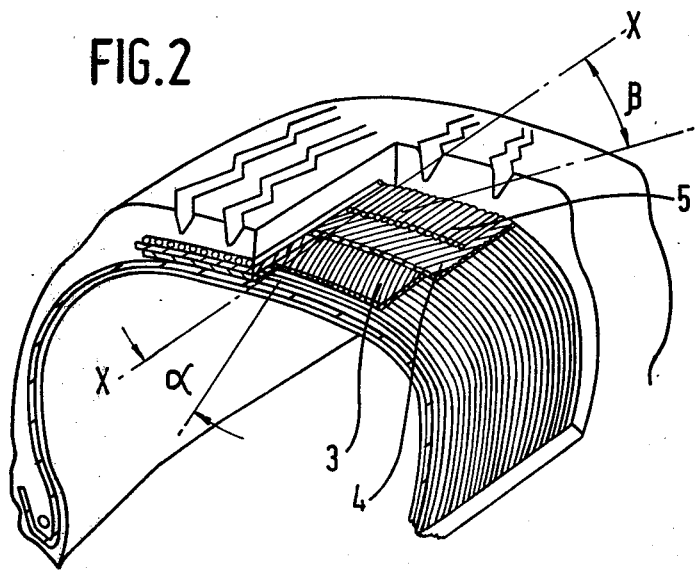

RADIAL TIRE FOR MOTOR VEHICLES

This is a continuation of application Ser. No. 753,290 filed Dec. 22, 1976, now abandoned.

The present invention relates to pneumatic tires for vehicle wheels and in particular to tires provided with a radial carcass (i.e., a carcass whose cords lie on meridian planes or form small angles with the planes) particularly suitable for heavy vehicles for normal and heavy duty and intended to be used for long distances at normal and high speed.

It is known that radial tires are usually provided with a structure which includes one or more reinforcing layers arranged at the crown zone of the carcass below the tread. The reinforcing layer is provided to withstand the tension stresses to which the tire is subjected, either because of the inflation pressure or in heavy service conditions due to the high speed.

Clearly, in case of large tires intended to be used on motor vehicles for normal and heavy duty, such as buses or coaches, or motor vehicles for industrial use, the tension stresses which are exerted on the reinforcing structure are very high. Hence, it is necessary to provide such tires with a reinforcing structure which is extremely resistant to tension stresses without using too many layers of reinforcing material because this would produce an increase of the weight and/or size of the tire and would require an increase of the inflation pressure with the consequent increase of the tension stresses on the reinforcing structure.

For these reasons, the trend commercially is to form the reinforcing structure with the lowest number of layers possible of reinforcing material having a high modulus of elasticity. Theoretically, the reinforcing structure which would assure the maximum resistance to tension stresses should be that constituted by one or more layers of metallic cords, having an ultimate elongation between 2.6 and 3.2% and oriented according to a direction which is substantially parallel to the longitudinal direction of the tire. However, such a reinforcing structure is not satisfactory because the tire has an undesirable driving behavior, particularly as regards transverse stability when the tire runs both along a curved trajectory and along a straight one.

Consequently, the reinforcing structure usually used to achieve the above described aims has two layers of metallic cords arranged so that the cords are parallel to one another in each layer and are symmetrically inclined with respect to the longitudinal direction of the tire at a relatively small angle of between about 5° and about 30°.

In such a way, the intrinsic rigidity of the material of the two layers is attenuated by a certain flexibility of the resulting reinforcing structure. In fact, the tension stresses due to the tire inflation result in a reduction of the angle of inclination of the cords of the two layers and a consequent increase of the tire diameter. Consequently, the reinforcing structure is quite satisfactory also as regards the torsional or transverse stiffness. This provides a tire which offers a good driving behavior, particularly as regards both the driving stability when the tire runs along a straight trajectory and the lack of drift when the tire runs along a curved trajectory.

However, especially in the large size tires which utilize a radial carcass having a mono-ply of metallic cords, it is found that, although the aforesaid reinforcing structure effectively withstands the tension stresses to which the tire is subjected, the reinforcing structure is not sufficient to counterbalance the high carcass flexibility. Consequently, the tire does not respond satisfactorily to steering. Therefore, it is necessary to add other layers to the reinforcing structure which act as a stabilizer. In general, a further strip of metallic cords is used which is arranged so that the cords are inclined with respect to the longitudinal direction at a high angle, for example, an angle of 60°.

It is an object of this invention to provide a pneumatic tire having a radial carcass which combines high resistance to tension stresses and good driving stability. Another object of the invention is to provide a pneumatic tire having a radial carcass and a tread with a reinforcing structure between the carcass and tread which has sufficient resistance to tension stresses to adapt the tire for use on heavy vehicles such as buses, trucks and the like and which does not significantly adversely effect the steering characteristics of the tire.

Other objects will become apparent from the following description of the invention with reference to the accompanying drawings wherein:

FIG. 1 illustrates in a partial cross-section one embodiment of the tire provided by the invention;

FIG. 2 illustrates in a fragmentary perspective view the tire shown in FIG. 1 with parts removed in order to better illustrate the arrangement of the various cords.

Figure 3:
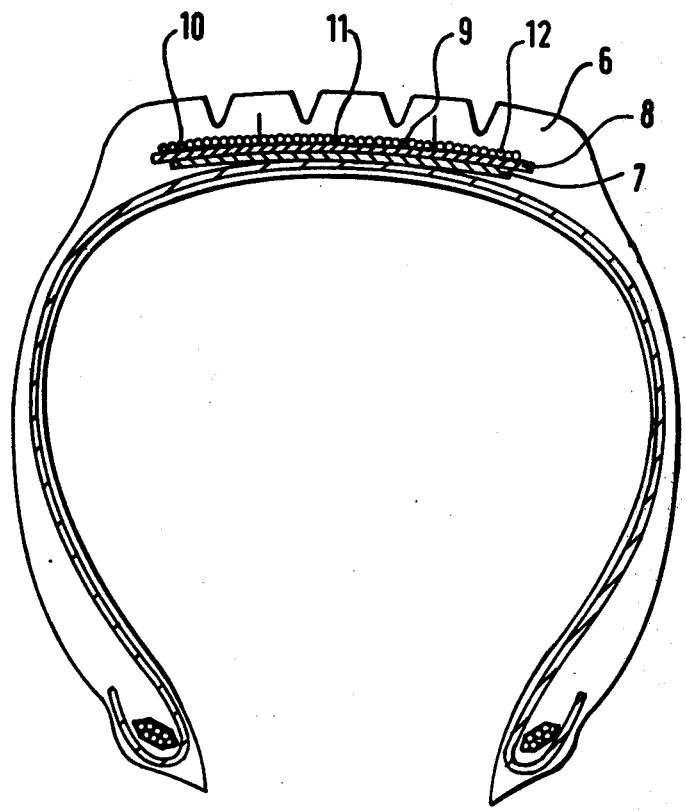
FIG. 3 illustrates in cross-section a second embodiment of the tire of the present invention.

It has now been found, surprisingly, that the application to a reinforcing structure having two layers of metallic cords of the type described of a third layer of metallic cords having a relatively high elongation and arranged in a direction which is substantially parallel to the longitudinal direction of the tire, not only provides the tires with the driving stability effects which until now were considered due exclusively to the strips of metallic cords having a high inclination with respect to the longitudinal direction, but also a very high resistance to the tension stresses. More specifically, such a reinforcing structure has a high enough resistance so that it withstands not only the tension stresses due to the inflation pressure of the tire, but also those which occur when the tire runs at high speed.

Accordingly, the present invention provides a pneumatic tire for motor vehicles adapted to be used for normal or heavy duty vehicles having a reinforcing structure comprising at least two layers which have widths which are about equal to the width of the tread and are formed by metallic cords having an ultimate elongation between 2.6 and 3.2%, the cords being parallel to one another in each layer and crossed with respect to those of the other layer, the two layers being arranged so that the cords are inclined with respect to the longitudinal direction of the tire at an angle of 5° to 30°. The tire has radially outwardly from the first two layers at least one layer of metallic cords having a width which is substantially equal to that of the tread, the outer layer being composed of metallic cords which are parallel to one another and are arranged in a longitudinal direction, the metallic cords having an ultimate elongation of about 4% to 8%.

The tires having the assembly of reinforcing layers as described above can be of the type intended to be mounted on the motor vehicle with or without the inner tube; moreover, although the assembly of reinforcing layers is extremely advantageous for tires having large sizes provided with a carcass constituted by a radial metallic mono-ply, it is understood that it will produce just as good results if applied to tires provided with a radial carcass having a plurality of plies and constituted by cords of textile material.

Preferably, the layer of metallic cords belonging to the reinforcing structure, which is immediately below the layer of metallic cords arranged in a longitudinal direction, has a width which is at least equal to that of the layer. The other layer of the reinforcing structure has a slightly smaller width, so that it is disposed inwardly with respect to the overhanging layer.

As set forth above, it has been found that the large size tires particularly those intended to be used for normal and heavy duty, which are provided with the assembly of reinforcing layers of this invention are able to offer high performances not only in service conditions at normal speed but also at higher speeds, and they have a very good driving behavior.

The effect of the assembly of reinforcing layers appears to be still more surprising, if it is taken into account that tests carried out on similar tires, having the same reinforcing structure of the first and second layers of metallic cords having an ultimate elongation between 2.6 and 3.2% plus a third superimposed layer of metallic cords like those of the first and second layer except that the cords are arranged in the longitudinal direction have shown a clear adverse effect on the driving and comfort characteristics of the tire. In other words, an assembly of reinforcing layers which combines a layer of metallic cords of about 3% elongation arranged in the longitudinal direction with the first and second layers used in this invention improves the resistance to tension stresses but the combination has the disadvantage of making steering of the vehicle more difficult. It has been found that in the assembly of the three layers of this invention, the layer of longitudinally disposed metallic cords supports almost all of the stresses. Therefore, the first and second layers are not under tension and do not interfere with the driving stability characteristics of the tire.

The improvement provided by the reinforcing assembly of the invention is probably due to the unique combination of relative inextensible metallic cords in the first two layers disposed at an angle inclined with respect to the longitudinal axis of the tire with the more extensible metallic cords of the radial outer layer. Apparently, the radial outer layer has a bearing action and cooperates with the other two layers.

The metallic cords having an ultimate elongation between about 4% and 8%, which hereinafter we will call "extensible", are per se widely known to one skilled in the art. They are constituted by strands formed by a plurality of wires twisted together and either the individual strands or the cord are all wound up helically in the same sense.

Vice versa, the metallic cords having an ultimate elongation between 2.6 and 3.2% which are also known per se, are constituted by strands formed by a plurality of wires helically wound up in an opposite sense with respect to that of the cord.

According to a preferred embodiment of the present invention, the layer or the layers of the extensible metallic cords are formed by a single extensible cord helically wound with the convolutions of the helix arranged in the longitudinal direction.

According to another preferred embodiment, the layer or each of the extensible metallic cords layers is formed by strips placed side by side, each of which has a width equal to a portion of the tread width and extends longitudinally on the whole development of the tire.

Referring now to FIG. 1, one embodiment of a tubeless tire of the size 11R22.5 has a tread 1 and a carcass 2 constituted by a mono-ply of metallic cords lying in a radial plane or forming small angles with the radial planes.

Between the tread 1 and the carcass 2 an assembly of reinforcing layers is inserted. This assembly has first and second layers 3 and 4 of metallic cords having an ultimate elongation equal to 3% and a third layer 5 radially outwardly with respect to the other two layers 3 and 4 of metallic cords having an ultimate elongation of 7%. The layers 3 and 4, as shown more clearly in FIG. 2, are arranged so that their metallic cords are parallel to one another in each layer and are inclined respective at an angle $\alpha$ and $\beta$ of 18° with respect to the longitudinal direction of the tire. The layer 5 has its own metallic cords arranged in a longitudinal direction.

The aforesaid assembly of layers 3, 4 and 5 has a width substantially equal to that of the tread 1. Since, as is customary, the reinforcing layers are arranged according to a certain graduation, it is preferred according to the present invention that the layer 4 has, in the reinforcing structure, the wider width so as to project slightly from both sides with respect to the layer 5, while the layer 3 has a slightly smaller width with respect to that of the layer 4. In such a way, the layer 5 has the metallic cords completely supported by the layer 4 along its whole width. This insures a lower elongation of the reinforcing assembly at its lateral ends, with consequent high performance of the tire in service at high speeds. Layer 5 is disposed on the layer 4 by helically winding an extensible metallic cord over layer 4 or one or more strips of cord fabric of extensible metallic cords are superimposed on layer 4.

Specifically as regards the metallic cords, those of layers 3 and 4 which, as aforesaid, have an ultimate elongation equal to about 3%, are each formed by seven strands twisted together, each strand being formed by the helical winding of four steel wires having a diameter equal to 0.22 mm. The strands are twisted together according to a winding sense opposite to that of the twisting of the individual strands. The metallic cords forming the layer 5 and having an ultimate elongation of 7% are each composed of three strands, twisted together, each strand being formed by the winding of seven steel wires having a diameter equal to 0.20 mm. The strands are twisted together according to a winding sense equal to that of the twisting of the individual strands, with the twisting pitch of each strand being equal to about 4 mm and with the twisting pitch of the cord being equal to about 6.5 mm.

FIG. 3 illustrates an alternate embodiment of the present invention according to which the tire 6 has the assembly of reinforcing layers constituted by two layers of metallic cords 7 and 8, about equal to the two layers 3 and 4 of FIGS. 1 and 2 and by the layer 9 of metallic cords having an ultimate elongation equal to 7%. Layer 9 consists of three strips, respectively 10, 11 and 12, placed side by side with respect to one another so as to cover the whole width of the underlying strip 8.

The central strip 11 is at least twice the width of the two other strips 10 and 12. The cords of all three strips may be the same.

Because of the curvature of the assembly of the reinforcing layers, these strips 10 and 12 have a longitudinal development lower than the corresponding development of the strip 11. Preferably the ends of each strip are joined together at points so that each joint is staggered with respect to the other, for example by 120°.

In order to demonstrate the improvement of the tires of the invention, the embodiment illustrated in FIGS. 1 to 3 of the drawing were compared both with conventional tires and with tires having a reinforcing structure comprising, in a way per se known, longitudinally arranged, reinforcing elements different from those of the present invention.

More particularly, the tires subjected to the tests were:

Tires A

Tubeless tires, size 11R22.5 (in accordance with the present invention) provided with a mono-ply radial metallic caracas, with a reinforcing structure, arranged between the tread and the carcass, consisting of first and second layers of metallic cords having an ultimate elongation of 3%, crossed with one another and inclined with respect to the longitudinal direction of the tire at an angle of 18° and with a third layer of metallic cords having an ultimate elongation of 7%, the third layer being arranged radially outside the first and second layers and having its cords arranged in the longitudinal direction of the tire.

Tires B

Tubeless tires, size 11R22.5, provided with a mono-ply radial metallic carcass, with a reinforcing structure consisting of first and second layers of metallic cords having an ultimate elongation of 3%, crossed with one another and inclined with respect to the longitudinal direction of the tire at an angle of 18°, and with a stabilizer strip, arranged in a radially inner position with respect to the first and second layers, constituted by metalic cords having an ultimate elongation of 3% and inclined at an angle of 60° with respect to the longitudinal direction (conventional tires).

Tires C

Tubeless tires, size 11R22.5, provided with a monoply radial metallic carcass and with a reinforcing structure consisting of three layers of metallic cords, all the cords having an ultimate elongation of 3%, two of the layers having the cords inclined at an angle of 18° and crossed with one another, while the third layer, radially outward to the first ones, had the cords arranged in a longitudinal direction.

Tires D

Tubeless tires, size 11R22.5, provided with a monoply radial metallic carcass, with a reinforcing structure consisting of two layers of metallic cords having an ultimate elongation of 3% crossed with one another and inclined at an angle of 18° with respect to the longitudinal direction, and with a layer of polyamide cords arranged in a longitudinal direction, in a radially outer position with respect to the first ones.

Tests

The above indicated tires were first of all subjected to laboratory tests in order to evaluate the detachment resistance of the reinforcing structure, particularly at high speeds. In practice, the test consisted of subjecting the tires to increasing speeds, each tire being mounted on a rim, inflated to a pressure of 8 kg/cm² and put under a load of 2,550 kg (pressure and load comparable with those maximum admissible in use). The imposed speeds were at first 70 km/h for 5 hours, with an increasing of the speed of 10 km/h every two hours. The obtained results were:

Tires A reached 160 km/h before detachment of the reinforcing structure.

Tires B reached 140 km/h before detachment of the reinforcing structure.

Tires C reaches 160 km/h before detachment of the reinforcing structure.

Tires D reached 140 km/h before detachment of the reinforcing structure.

From the above, it is noted that tires whose reinforcing structure comprises metallic cords arranged in the longitudinal direction (both having a low and high elongation) give the better results.

Then the power consumption resulting from using the different types of test tires was determined. It was found that tires A, C and D gave a power consumption analogous and lower than that resulting from using tires B.

Then the steering response (an extremely important characteristic, as the test tires were intended to be used for duty at high speeds) was checked. It was found that tires A and B had good steering characteristics while tires C and D had very poor steering characteristics.

Because of the poor steering charactistics of tires C and D they were not road tested.

Road tests with tires A and B were carried out on a running-track. Each type of tire was mounted on a truck, each tire having an overload of 20% with respect to its maximum capacity. The tires were first run 30,000 km, at a speed of 122 km/h, along a straight stretch. At the end of this first part of the test, it was noted that the tread of tires A and B showed an equivalent wear, and neither type had significant crackings or damages. In the second part of the test, the truck was run over a curved track and reverse curved track. After a run of 1100–1900 km, tires B showed detachments among the layers of the reinforcing structure so that the test had to be stopped. Tires A instead ran without detachment until the whole tread was worn.

The results obtained from all these tests demonstrate that the tires according to the present invention have improved performances in every sense over the other test tires although the structure of the reinforcing layers at first sight may appear to be only slightly different from that of the known tires.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a pneumatic radial tire for vehicles having a tread, a carcass having a crown, a tread band, and a breaker structure disposed at the crown of the carcass between said tread and said carcass to support the tension stresses in the longitudinal direction in said radial tire during use, said breaker structure comprising two layers of metallic cords, said layers being approximately equal in width to the width of the tread, said cords being parallel to one another in each layer and crossed with respect to those of the adjacent layer and arranged so that said cords are aligned with respect to the longitudinal direction of the tire at an angle between 5° and 30°, said cords having an ultimate elongation between 2.6% and 3.2%, the improvement wherein, there is placed in a radially outer position to said layers at least one layer of metallic cords having a width substantially equal to that of said tread, said cords being constituted by a plurality of strands wound together, said cords of the radially outer layer being arranged parallel to one another and in a longitudinal direction and having an ultimate elongation between 4% and 8%, the individual strands constituting said cords and the resulting cord being wound in the same sense, the cords of the radially outer layer providing a layer which cooperates with the radially inner layers in bearing said tension stresses, the layer or layers of metallic cords having an ultimate elongation between 4% and 8% being the radially outermost layer(s).

2. The pneumatic tire of claim 1 wherein the layer or the layers of metallic cords having an ultimate elongation between 4% and 8% are constituted by a single cord helically wound, with the convolutions of the helix arranged in a longitudinal direction.

3. The pneumatic tire of claim 1 wherein said layer or layers of said radially outer metallic cords comprise at least two strips placed side by side, each of said strips having a width equal to a portion of the tread width and extending longitudinally on the whole development of the tire.

* * * * *